Patented Jan. 8, 1924.

1,480,110

UNITED STATES PATENT OFFICE.

MAXWELL GEORGE PLATTEN, OF SALT LAKE CITY, UTAH.

PROCESS FOR PRODUCING METALLIC LEAD FROM ORES, PRODUCTS, AND COMPOUNDS.

No Drawing.  Application filed November 8, 1920. Serial No. 422,490.

*To all whom it may concern:*

Be it known that I, MAXWELL GEORGE PLATTEN, a citizen of the United States, residing at Salt Lake City, in the county of Salt Lake and State of Utah, have invented certain new and useful Improvements in Processes for Producing Metallic Lead from Ores, Products, and Compounds, of which the following is a specification.

The present invention relates to treating ores and other compounds carrying lead, and has for its object to provide a new process of precipitating lead in the metallic state by and upon metallic iron from neutral or acid brine solutions containing lead in solution.

Another object of my process is to remove the lead from neutral or acid brine solutions as a relatively clean metallic product, and to leave the practically barren brine solution in condition ready for reuse, or for other uses in which brine is required.

As is well known to all metallurgists, the treatment of brine solutions to recover the lead content, is a metallurgical problem of great importance. Heretofore lead has been precipitated out in the metallic state from brine solutions by metals other than iron, such as zinc, aluminum and cadmium, the use of which is well known and not new, and by electrolysis. My new process secures the precipitation of lead in the metallic state by the use of metallic iron, from brine solutions, without the use of other metals such as zinc, aluminum or cadmium, or the use of an electric current. By my process I secure practically a complete precipitation of the lead from brine solutions by and upon metallic iron, leaving the practically barren brine solution ready for reuse, or to be discharged to waste, as the case may be.

The process depends upon the following discoveries, which I have made while experimenting with neutral, very slightly acid, slightly acid, and acid brine solutions containing lead in solution. I have found that lead can be readily precipitated out of solution in the metallic state, by and upon metallic iron, from a neutral brine solution, and from a very slightly acid brine solution or slightly acid brine solution or acid brine solution, said acid brine solution which may contain one or more inorganic acids such as sulphuric, or hydrochloric, or nitric, or other inorganic acid or acids, and from a very slightly acid, slightly acid, or acid brine solution which may contain one or more organic acids such as acetic acid, and from a very slightly acid brine solution, or slightly acid brine solution, or acid brine solution, which solution may contain an inorganic acid and an organic acid, or more than one inorganic acid and more than one organic acid, and from a neutral brine solution from which the lead content has been only partially precipitated. As for example, by the use of an alkali or alkalies such as sodium hydroxide, whether or not the partially precipitated lead remains in a state of suspension, has settled, or been removed from the solution, does not in any appreciable manner hinder the practically complete precipitation of the remaining lead in solution, by my process of precipitation upon metallic iron. I have found that maximum precipitation of the lead from a brine solution, upon metallic iron, occurs in the minimum of time, at practically the boiling point of the solution, and that lead can be precipitated from a brine solution upon metallic iron at any temperature from 2° C. up to and including the boiling point of the solution; however, as the temperature of the solution is increased, the rate of precipitation of the lead is increased. I have also found that if the brine solution contains as excessive amount of an inorganic acid or acids such as sulphuric, hydrochloric or nitric, or other inorganic acid or acids, that precipitation of the lead upon iron does not occur to any great extent until the excess acid or acids have been taken up by dissolving some of the metallic iron used as the precipitant of the lead, or the addition of just sufficient of an alkali such as sodium hydroxide, to neutralize the excess acid but leaving the solution slightly acid or neutral when practically a complete precipitation of the lead can be made upon metallic iron.

I have found that the lead precipitated out of brine solutions by and upon metallic iron is a sponge-like metallic mass. If the brine solution is neutral or very slightly acid with an inorganic acid or acids, the deposited lead is loose and easily removed from the iron with a very small amount adhering to the iron; when slightly acid with an inorganic acid or acids the precipitated lead has a slightly increased tendency to adhere to the iron but the greater precentage is readily removable; while if the brine solution contains an excess of an inorganic acid or acids the tendency of the precipitated lead is to adhere to the iron to a more or less extent as a hard metallic mass until the excess acid is taken up by the metallic iron, when the remaining lead precipitates out in a sponge-like, easily removable mass. If the brine solution is slightly or strongly acid with an organic acid or acids the precipitated lead for the greater part is loose and easily removed with a very small amount adhering to the iron. However, the exact character of the deposited lead also depends upon the temperature of the brine solution, period of time of precipitation, amount of iron precipitating, surface exposed for the lead precipitation, etc.

That my process is very efficient in its operation can be seen from the following example; A complex oxidized-sulphide ore containing lead was crushed and treated with a brine solution. The pregnant brine solution resulting therefrom was heated to boiling; and the lead was precipitated out of solution upon metallic iron as metallic lead. The tailing solution upon analysis was found to contain only a trace of lead, thus giving a lead extraction of practically 100%. In the application of the process, the strength of the brine solution so as to get a maximum precipitation of the lead, whether neutral, very slightly acid, slightly acid or acid, the lead content of the brine solution up to the point of saturation, most suitable range of temperature, and necessary time of precipitation, will obviously be varied to meet the particular conditions As an example of the practical application of my process, a complex oxidized-sulphide ore carrying silver, copper and lead values was treated with a brine solution. The pregnant brine solution resulting therefrom was heated to boiling and passed over and in contact with metallic copper for 15 minutes to precipitate metallic silver; then over metallic lead for 15 minutes to precipitate metallic copper and some of the remaining silver, then by my process of passing the solution over and in contact with metallic iron, to precipitate out metallic lead. In this example the time of the precipitation of lead upon metallic iron was 15 minutes. This precipitate of metallic lead upon analysis was found to contain: Gold, none; silver, 0.15 oz.; lead, 98.96%; copper, 0.06%; iron, 0.22%. Upon melting this lead precipitate into a bar it then analyzed: Gold, none; silver, 0.15 oz.; lead, 99.9%; copper, 0.01%; iron, trace. The reason the lead precipitate, or sponge lead, does not show as high a lead content as the melted lead, is because after the precipitate is removed from the brine solution it is washed with water, then quickly dried, preparatory to melting. It is during the drying process that a slight oxidation of the lead takes place, thus lowering the lead per cent. After the lead precipitation the practically barren brine solution is ready for reuse, to treat more ore or products or by-products, chemical compounds or compounds, and is valuable for other uses in which a brine solution could be used, or to be discharged to waste, as desired.

In the practical application of the process, in a general way the treatment will be as follows: ores, products, by-products, chemical compounds, or compounds, containing lead which is soluble in brine solutions, will be leached by a neutral, very slightly acid, slightly acid, or acid brine solution; the resulting pregnant brine solution, which may be neutral, very slightly acid, slightly acid or acid, will then be passed over and in contact with metallic silver, to precipitate out gold in the metallic state, then passed over and in contact with metallic copper to precipitate out metallic silver, then passed over and in contact with metallic lead to precipitate out metallic copper, all of which are well known and not new processes of precipitation of said metals, and then by the use of my process, which is new, and which consists in passing the pregnant lead brine solution over and in contact with metallic iron, when lead will be precipitated out in the metallic state. The precipitated metallic lead will then be separated from the practically barren brine solution by filtration of decantation or other suitable means, leaving said practically barren brine solution ready for reuse to dissolve more lead in ores, products, by-products, chemical compounds or compounds, whatever the case may be, or to be discharged to waste.

Having described my process, what I claim and desire to patent is:

1. A process for treating lead ores which consists of subjecting the crushed ore to leaching in a saline solvent, then passing the solution thus obtained over and around metallic iron to precipitate the lead content of the solution as metallic lead, then separating the saline solvent for further use on other ores, and melting the iron and lead to separate the lead from the iron.

2. The process of precipitating lead out of a pregnant brine solution to save the lead content, which consists of leaching crushed ore, which contains lead, in a brine solution to produce the pregnant brine solution, then passing said solution over and in contact with metallic iron, then separating the precipitates from the solution and melting the precipitates.

In testimony whereof I have affixed my signature.

MAXWELL GEORGE PLATTEN.